(12) United States Patent
Singh et al.

(10) Patent No.: US 8,208,414 B2
(45) Date of Patent: Jun. 26, 2012

(54) SYSTEM AND METHOD FOR CONFIGURABLE TIME-DIVISION DUPLEX INTERFACE

(75) Inventors: Baljit Singh, San Jose, CA (US); Scott Stratford, Campbell, CA (US)

(73) Assignee: LGC Wireless, Inc., San Jose, CA (US)

( * ) Notice: Subject to any disclaimer, the term of this patent is extended or adjusted under 35 U.S.C. 154(b) by 651 days.

(21) Appl. No.: 12/144,913

(22) Filed: Jun. 24, 2008

(65) Prior Publication Data

US 2009/0316608 A1    Dec. 24, 2009

(51) Int. Cl.
   *H04J 3/00*    (2006.01)
(52) U.S. Cl. ......... 370/280; 370/310; 370/315; 370/328
(58) Field of Classification Search .................. 370/280, 370/281
   See application file for complete search history.

(56) References Cited

U.S. PATENT DOCUMENTS

| | | | |
|---|---|---|---|
| 5,867,292 A | 2/1999 | Crimmins et al. | |
| 6,205,133 B1 | 3/2001 | Bexten | |
| 6,801,767 B1 * | 10/2004 | Schwartz et al. | 455/426.2 |
| 7,215,651 B2 | 5/2007 | Millar | |
| 7,250,830 B2 | 7/2007 | Layne et al. | |
| 2007/0254692 A1 * | 11/2007 | McCoy | 455/553.1 |
| 2009/0122731 A1 * | 5/2009 | Montojo et al. | 370/280 |
| 2009/0296609 A1 * | 12/2009 | Choi et al. | 370/281 |
| 2009/0316609 A1 | 12/2009 | Singh | |

OTHER PUBLICATIONS

International Searching Authority, "International Search Report", Jan. 29, 2010, Published in: WO.

* cited by examiner

*Primary Examiner* — Derrick Ferris
*Assistant Examiner* — Matthew Hopkins
(74) *Attorney, Agent, or Firm* — Fogg & Powers LLC

(57) ABSTRACT

A communication system comprises a first unit; and a second unit communicatively coupled to the first unit. The first unit is operable to receive a first original radio frequency signal via a first interface and the second unit is operable to receive a second original radio frequency signal via a second interface. The second unit is operable to output a first reproduced radio frequency signal via the second interface, the first reproduced radio frequency signal being derived from the first original radio frequency signal. The first unit is operable to output a second reproduced radio frequency signal via one of the first interface and a third interface, the second reproduced radio frequency signal being derived from the second original radio frequency signal. The first interface is operable as a simplex interface when the second reproduced radio frequency signal is output via the third interface and as a duplex interface when the second reproduced radio frequency signal is output via the first interface.

28 Claims, 5 Drawing Sheets

SYSTEM AND METHOD FOR CONFIGURABLE TIME-DIVISION DUPLEX INTERFACE

CROSS-REFERENCE TO RELATED APPLICATIONS

This application is related to the following applications filed on even date herewith, which are hereby incorporated herein by reference:

U.S. patent application Ser. No. 12/144,961, entitled "METHOD AND APPARATUS FOR FRAME DETECTION IN A COMMUNICATIONS SYSTEM".

U.S. patent application Ser. No. 12/144,977, entitled "METHOD AND APPARATUS FOR SWITCHING IN A TDD SYSTEM".

U.S. patent application Ser. No. 12/144,939, entitled "SYSTEM AND METHOD FOR SYNCHRONIZED TIME-DIVISION DUPLEX SIGNAL SWITCHING".

BACKGROUND

Time-division duplex (TDD) methods emulate full duplex communication over a half duplex communication link. In particular, signals that are communicated from a first device to a second device occur at a different time than when signals are communicated from the second device to the first device. Typically, one direction of communication is referred to as the "downlink" direction (and the corresponding signals are referred to here as "downlink signals" or "downlink communications"), and the other direction of communication is referred to as the "uplink" direction (and the corresponding signals are referred to here as "uplink signals" or "uplink communications"). For example, in some systems, separate downlink and uplink timeslots or sub-frames are assigned.

Many systems use TDD for communication. For example, some implementations of the Institute of Electrical and Electronics Engineers (IEEE) 802.16 standard use TDD for communication of wireless radio frequency signals. For example, the Worldwide Interoperability for Microwave Access (WIMAX) Forum has promulgated implementation profiles based on IEEE 802.16 that use TDD. In one such WIMAX profile, the amount of time assigned to communications in each direction is dynamically allocated. In other words, as the amount of uplink data increases more bandwidth in the form of a larger sub-frame is allocated to the uplink direction.

In order for successful communication between devices in a TDD system, the devices need to synchronize when they switch from communicating in the downlink direction to communicating in the uplink direction and when they switch from communicating in the uplink direction to communicating in the downlink direction. Otherwise, signals will be lost due to interference or missed because each device was not switched to the same signal direction. The IEEE 802.16 standard specifies the use of global positioning system (GPS) receivers to provide a precise time reference for synchronizing each device. Moreover, the IEEE 802.16 standard also contemplates that each device has the ability to demodulate and decode IEEE 802.16 frames and sub-frames in order to extract information indicating how long each of the downlink and uplink sub-frames will be. The extracted information is also used to determine when to switch communication directions.

In some locations, there may be issues with sending and receiving WIMAX signals. For example, there may be WIMAX coverage issues within buildings (such as office and apartment buildings, hospitals, and airports). One way to improve RF coverage within buildings makes use of a frequency translating distributed antenna system (DAS). For example, in one such distributed antenna system, downlink RF signals received at a donor antenna located on the roof of a building are down converted to an intermediate frequency (IF) signal by a hub unit and distributed over transport cabling (for example, optical fiber, coaxial cable, CATV cable, twisted-pair cabling) to a remote antenna unit located within the building. The downlink IF signals received at the remote antenna unit are up converted back to the original RF frequency and radiated from a remote antenna. Similarly, uplink RF signals received at the remote antenna are down converted by the remote antenna unit to IF signals and transported over transport cabling back to the hub unit. The uplink IF signals received at the hub unit are up converted back to the original RF frequency and radiated from the donor antenna. One example of such a distributed antenna system is described in U.S. Pat. No. 6,157,810.

In addition, some systems also use TDD for communication with upstream devices coupled to the main hub, such as a base station or repeater. However, some such upstream devices are not configured for TDD and, thus, cannot be successfully connected to the hub. For example, some upstream devices are configured with two separate interfaces for simplex rather than duplex operation. In order to enable connection with such devices, a combiner is typically placed between the simplex device and the hub. The combiner converts between time-division duplexed signals and simplex signals. However, an additional cost is incurred for each network device which requires a combiner to successfully connect to the hub.

SUMMARY

The above mentioned problems and other problems are resolved by the present invention and will be understood by reading and studying the following specification.

In one embodiment, a communication system is provided. The communication system comprises a first unit; and a second unit communicatively coupled to the first unit. The first unit is operable to receive a first original radio frequency signal via a first interface and the second unit is operable to receive a second original radio frequency signal via a second interface. The second unit is operable to output a first reproduced radio frequency signal via the second interface, the first reproduced radio frequency signal being derived from the first original radio frequency signal. The first unit is operable to output a second reproduced radio frequency signal via one of the first interface and a third interface, the second reproduced radio frequency signal being derived from the second original radio frequency signal. The first interface is operable as a simplex interface when the second reproduced radio frequency signal is output via the third interface and as a duplex interface when the second reproduced radio frequency signal is output via the first interface.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
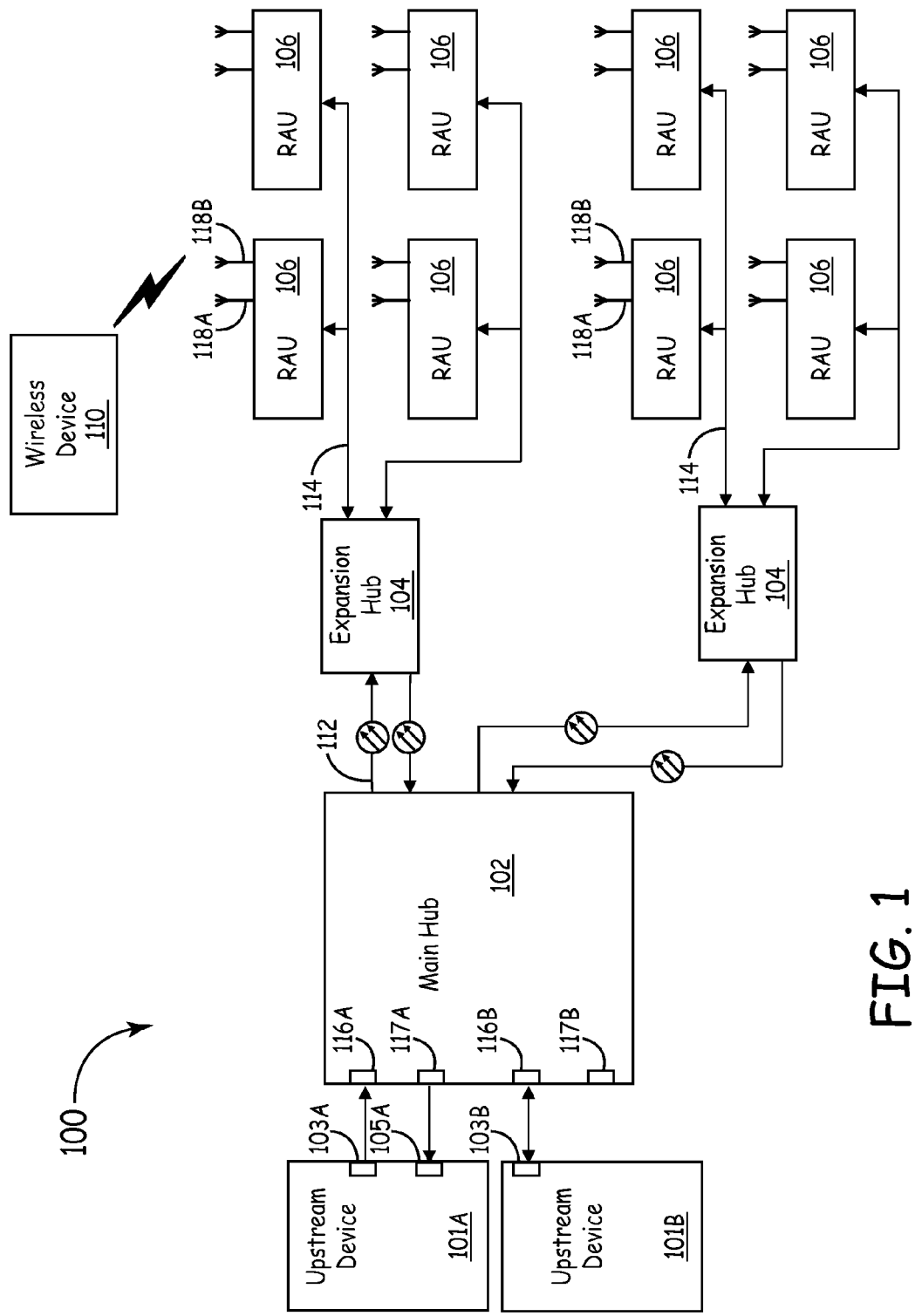
FIG. 1 is a block diagram of one embodiment of a distributed antenna system for distributing a TDD radio frequency signal.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

FIG. 1 is a block diagram of one embodiment of a distributed antenna system 100 for distributing a TDD radio frequency signal. The distributed antenna system 100 shown in FIG. 1 is described here as being implemented in order to distribute TDD WiMAX RF signals. However, it is to be understood that other embodiments can be implemented in other ways (for example, to distribute other types of TDD RF signals, such as Wireless Broadband or WiBro). The distributed antenna system 100 is used to transport radio frequency signals between one or more upstream devices 101 (such as base station transceivers or wireless access points or other sources of radio frequency signals) and one or more downstream wireless devices 110 (for example, mobile station, fixed wireless modem, or other wireless devices). In some embodiments, the upstream devices 101 are a part of a telecommunication-service providers' infrastructure while the downstream devices comprise customer premise equipment. In general, for each radio frequency signal or channel over which an upstream device 101 communicates with a downstream wireless device 110, an original downlink radio frequency signal is originally transmitted by the upstream device 101 for reception by the downstream wireless device 110 and an original uplink radio frequency signal is originally transmitted by the downstream wireless device 110 for reception by the upstream device 101. In the particular embodiments described here, a time division duplexing scheme is used to share each radio frequency channel. The DAS 100 is used to improve the wireless coverage of the upstream devices 101.

The distributed antenna system 100 includes a first unit that is communicatively coupled to one or more second units (for example, directly or via one or more intermediate units). In the exemplary embodiment of FIG. 1, the first unit comprises a main hub 102, the intermediary unit comprises expansion hubs 104, and the second unit comprises remote antenna units (RAU) 106. Notably, although only eight RAUs 106 and two expansion hubs 104 are shown in this example, for purposes of explanation, other numbers of RAUs 106 and expansion hubs 104 can be used in other embodiments. In particular, in some embodiments, up to eight RAUs can be connected to each expansion hub 104 and up to four expansion hubs 104 can be coupled to the main hub 102.

In the particular embodiment shown in FIG. 1, the main hub 102 is communicatively coupled to the remote antenna units 106 via one or more intermediate expansion hubs 104. In such an embodiment, the main hub 102 is communicatively coupled to each of the expansion hubs 104 via one or more communication links 112. For example, in one embodiment described here in connection with FIG. 1, the links 112 comprise one or more fiber optic cables. In particular, as shown in FIG. 1, a separate optic fiber is used for the downlink and uplink signals between each expansion hub 104 and main hub 102. However, in other embodiments, a wavelength division multiplexing (WDM) optical combiner is used in expansion hubs 104 and main hub 102 in order to use a single fiber for both the uplink and downlink signals between each expansion hub 104 and main hub 102. The remote antenna units 106 are communicatively coupled to the expansion hub 104 via appropriate links 114. Appropriate links 114 include, for example, thin coaxial cabling, CATV cabling, or fiber optic cabling where multiple RF frequency bands are distributed or lower-bandwidth cabling, such as unshielded twisted-pair cabling, for example, where only a single RF frequency band is distributed.

The main hub 102 is communicatively coupled to one or more upstream devices 101 (such as base stations, wireless access points, donor antennas or bidirectional amplifiers or repeaters). In the particular embodiment shown in FIG. 1, each upstream device comprises a WiMAX base station 101 (individually referenced as 101A and 101B). Also, the embodiment shown in FIG. 1 is described here providing support for the multiple-input multiple-output (MIMO) communication technology defined for some WiMAX system profiles. However, it is to be understood that, in other embodiments, the MIMO communication technology is not supported.

In this particular embodiment, the WiMAX base station 101A has two RF interfaces 103A and 105A, each of which is directly coupled (for example, via a respective coaxial cable) to RF interfaces 116A and 117A, respectively, of the main hub 102. In addition, WiMAX base station 101B has one RF interface 103B directly coupled to RF interface 116B of main hub 102.

RF interfaces 117A and 117B are configured to operate solely in simplex mode. In particular, only uplink communication signals are transported via RF interfaces 117A and 117B from main hub 102 to WiMAX base stations 101A and 101B. However, RF interfaces 116A and 116B are configurable to operate either in simplex mode or duplex mode. When configured to operate in simplex mode, only downlink communication signals are transported via RF interfaces 116A and 116B. When configured to operate in duplex mode, both uplink and downlink communication signals are transported via RF interfaces 116A and 116B. In the exemplary embodiment shown in FIG. 1, RF interface 116A is configured to operate in simplex mode, while RF interface 116B is configured to operate in duplex mode.

Also, in the particular MIMO WiMAX embodiment shown in FIG. 1, each remote antenna unit 106 is coupled to two remote antennas 118 (individually referenced as 118A and 118B) from which RF signals are communicated to and from one or more wireless devices 110. It is to be understood, however, that in other embodiments, each remote antenna unit 106 is coupled to a different number of antennas (for example, a single antenna where a diplexer and filters are used to combine and separate RF signals as needed).

The DAS 100 is configured to support two radio frequency bands in the downlink direction and two radio frequency bands in the uplink direction. More specifically, the "downlink RF band A" is used to communicate downlink RF signals from RF interface 103A in WiMAX base station 101A to the main hub 102 on RF interface 116A and, ultimately, to each of the remote antennas 118A to be radiated therefrom. The "downlink RF band B" is used to communicate downlink RF signals from RF interface 103B in WiMAX base station 101B to the main hub 102 on RF interface 116B and, ultimately, to each of the remote antennas 118B to be radiated therefrom. The "uplink radio frequency band A" is used to communicate uplink RF signals received on each of the remote antennas 118A to RF interface 117A of the main hub 102 and, ultimately, to RF interface 105A of the WiMAX base station 101A. The "uplink radio frequency band B" is used to communicate uplink RF signals received on each of the remote antennas 118B to RF interface 116B of the main hub 102 and, ultimately, to RF interface 103B of the WiMAX base station 101B.

In some embodiments, the RF frequency band used for downlink RF signal band A is the same as the one used for downlink RF signal band B. Likewise, the RF frequency band used for uplink RF signal band A is the same as the one used for uplink RF signal band B. It is to be understood, that in other embodiments, however, the RF frequency band used for downlink RF signal band A differs from the one used for downlink RF signal band B.

Also, because of the use of TDD, the RF frequency band used for downlink RF signal band A is the same as the one used for uplink RF signal band A. Likewise, the RF frequency band used for downlink RF signal band B is the same as the one used for uplink RF signal band B. As a result, in the following description, reference is sometimes made to "RF band A" and "RF band B". However, as noted above, the use of TDD requires the main hub 102 and each remote antenna unit 106, for each of the RF bands A and B, to switch between communicating in a downlink direction (that is, from the main hub 102 to the remote antenna unit 106) and communicating in an uplink direction (that is, from each remote antenna unit 106 to the main hub 102) and between communicating in the uplink direction and communicating in the downlink direction.

In some embodiments, switching is coordinated through extracting information from the frames indicating how long each of the downlink and uplink sub-frames will be, as described above. In other embodiments, main hub 102 is configured to transmit control signals used to control switching in each RAU 106 as described in U.S. patent application Ser. No. 12/144,939, and entitled "System and Method for Synchronized Time-Division Duplex Signal Switching" (the '924 application). The '924 application is incorporated herein by reference.

In the particular MIMO WiMAX embodiment shown in FIG. 1, the WiMAX base station 101A and 101B each transmit an original downlink RF signals from the respective RF interfaces 103, both original downlink RF signals being transmitted in the same RF frequency band. The original downlink RF signals are supplied to respective interfaces 116 of the main hub 102. As is described in more detail below, each of the original downlink RF signals is separately filtered and down converted to an intermediate frequency (IF). The original downlink RF signals are down converted to different IF frequency bands. The two downlink IF signals are combined (that is, multiplexed using frequency division multiplexing (FDM)) for distribution to the remote antenna units 106.

The combined downlink IF signals are communicated to each expansion hub 104 over a respective fiber link 112 using an analog optical modulator. Each expansion hub 104 receives and demodulates the optical signal to recover the combined downlink IF signal, which is then transmitted to each of the remote antenna units 106 that are coupled to that expansion hub 104 using the cabling 114. Each remote antenna unit 106 receives the combined IF signal and separates the IF signals into separate IF signals for each downlink RF signal that was originally received from the WiMAX base stations 101A and 101B. The remote antenna unit 106 then upconverts each such separated IF signal to its original RF frequency as was received from the WiMAX base stations 101A and 101B (which is the same for both) in order to reproduce each original downlink radio frequency signal. The reproduced downlink RF signal that corresponds to downlink radio frequency band A is then radiated from remote antenna 118A for that remote antenna unit 106, and the reproduced downlink RF signal that corresponds to downlink radio frequency band B is then radiated from remote antenna 118B for that remote antenna unit 106. Both reproduced downlink RF signals are radiated for reception by a suitable wireless device 110 (if any) that is located within the coverage area of that remote antenna unit 106.

A similar process is performed in the uplink direction. Each wireless device 110 transmits two original uplink RF signals from two respective antennas. At each remote antenna unit 106, each of the remote antennas 118A and 118B for that RAU 106 receives the two original uplink RF signals. The received original uplink RF signals are filtered to remove out-of-band signals. The remote antenna unit 106 downconverts each such uplink RF channel to a different intermediate frequency (IF) for distribution back to the main hub 102 via an expansion hub 104. The downconverted uplink IF channels are combined (using FDM) and communicated to each expansion hub 104 over a respective cable 114. Each expansion hub 104 combines the various IF uplink signals it receives from the remote antenna units 106 that are coupled thereto and communicates the combined IF channels to the main hub 102 over a fiber link 112 using an analog optical modulator. The main hub 102 receives and demodulates the optical signal from each expansion hub 104 to recover the combined uplink IF signal transmitted from that expansion hub 104. The recovered combined uplink IF signals from all of the expansion hubs 106 are then combined. The main hub 102 then separates that combined uplink IF signal into separate uplink IF signals, one of which corresponds to those of uplink RF band A and the other of which corresponds to uplink RF band B.

The main hub 102 then upconverts each such separated IF signal to its original RF frequency as was received over the air (which is the same for both uplink RF bands A and B in this embodiment) in order to reproduce each original uplink radio frequency signal. The reproduced uplink RF channel corresponding to RF band A is then communicated to RF interface 105A of the WiMAX base station 101A via RF interface 117A of the main hub 102. The reproduced uplink RF channel corresponding to RF band B is communicated to RF interface 103B of WiMAX base station 101B via RF interface 116B of the main hub 102.

In other embodiments, separation of the signals is not required if the IF and RF frequencies are selected such that block upconverters and block downconverters can be used (instead of using separate, individual narrowband upconverters and downconverters). In the simplest example of such an embodiment, if the system were designed to distribute multi-carrier GSM in the 900 MHz band and each carrier were located at the correct frequency offset from each other, the entire IF spectrum could be upconverted as one continuous block versus having individual narrow band upconverters and likewise with the downconversion of the RF spectrum Power may also be provided to the remote antenna units 106 over the cabling 114 such that no additional power source is needed to power the remote antenna units 106. The DAS 100 may include one or more of the following: filtering, amplification, wave division multiplexing, duplexing, synchronization, and monitoring functionality as needed.

More specifically, main hub 102 is configured to support both duplex and simplex communication links, as described above, between an upstream device 101 and main hub 102 as described in more detail below. By enabling the use of either duplex or simplex communication links with the same hub, embodiments of the present invention reduce both the cost and complexity of typical systems implementing TDD. As stated above, typically a combiner is placed between upstream devices and main hub 102 to enable the use of simplex devices and links. However, this added cost is avoided by main hub 102. In addition, the processing time and complexity of combining simplex communication links into one duplex link is also avoided.

Figure 2:
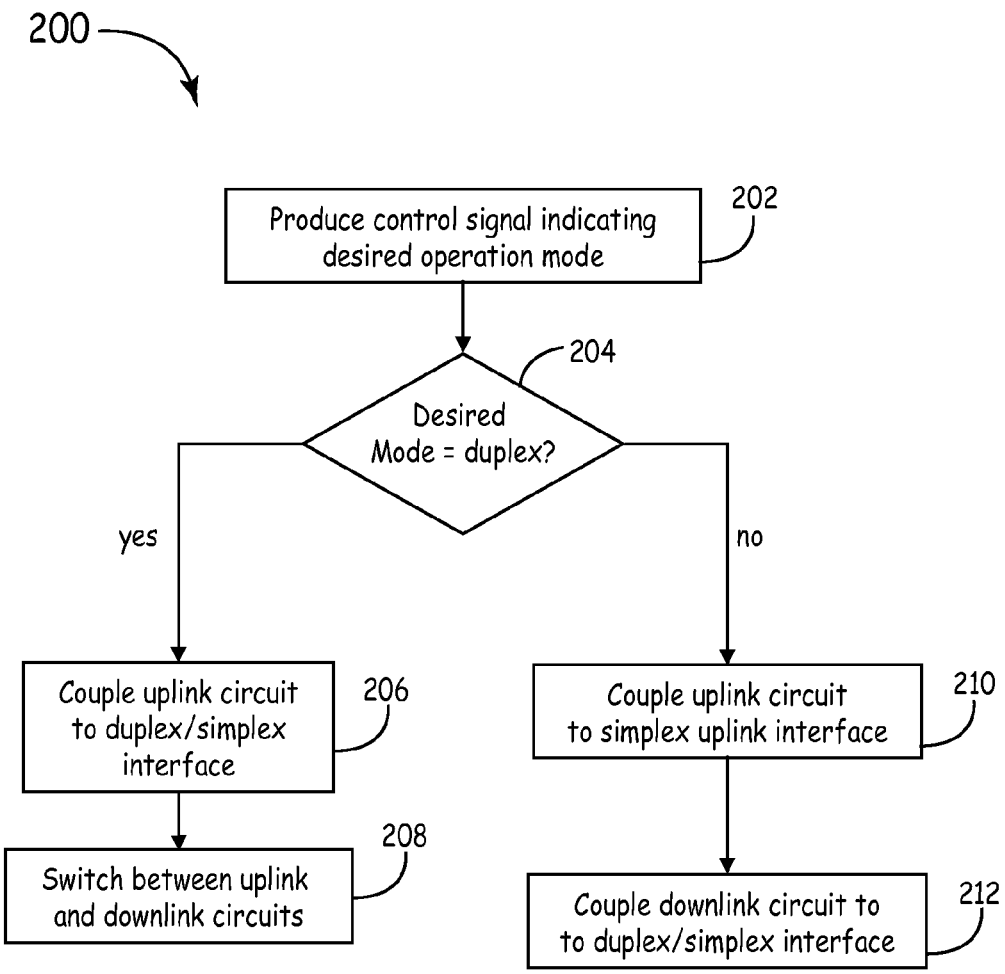
FIG. 2 is a flow diagram illustrating one embodiment of a method of configuring the operation mode of a hub.

FIG. 2 is a flow diagram illustrating method 200 of configuring the operation mode of a hub. In the following description of FIG. 2, method 200 is described here as being implemented in connection with the DAS 100 of FIG. 1. More specifically, method 200 is described here as being implemented using the main hub 102. It is to be understood that the method 200 can be implemented in other types of communication systems that make use of TDD. Moreover, method 200 is also described here with reference to one of the frequency bands supported by the DAS 100 of FIG. 1, though it is to be understood that such processing is also performed for the other frequency band.

Method 200 comprises producing a control signal which indicates the desired operation mode (block 202). In particular, the control signal indicates either simplex or duplex mode. In this example, the control signal is produced based on user input during installation of the main hub 102. However, it is to be understood that in other embodiments, the control signal can be produced in other situations. For example, in some embodiments, the main hub 202 is configured to automatically produce the control signal in order to self-configure based on detection of a connection to simplex interface 117. In addition, a separate control signal is produced for each of RF bands A and B enabling simultaneous simplex and duplex operation.

The desired operation mode is indicated to be either duplex or simplex for each of RF bands A and B (block 204). If the desired operation mode for one of RF bands A and B is indicated to be duplex mode, a respective uplink IF/RF circuit is coupled to a respective simplex/duplex interface 116 (block 206). In particular, in this embodiment, the uplink IF/RF circuit is coupled to the respective simplex/duplex interface 116 via another switch and a band-pass filter, as described in more detail below. The uplink IF/RF circuit is configured to upconvert uplink IF signals to a respective RF frequency band, as described in more detail below. For duplex mode, the main hub 102 switches between communicating in the downlink direction and communicating in the uplink direction (block 208). In this exemplary embodiment, switching between communicating in the downlink direction and communicating in the uplink direction comprises monitoring for communication signals propagating in the downlink direction. When downlink signals are detected, the duplex/simplex interface is switched to the respective downlink IF/RF circuit and the duplex/simplex interface is switched to the respective uplink IF/RF circuit when downlink signals are not detected propagating in the downlink direction.

If the desired operation for one of RF bands A and B is indicated to be simplex mode, the respective uplink IF/RF circuit is coupled to a simplex uplink interface 117 (block 210). The respective downlink IF/RF circuit is coupled to a respective duplex/simplex interface 116 (block 212). Each of the respective uplink IF/RF circuits and downlink IF/RF circuits are coupled to the respective interface via a band-pass filter in this embodiment, as described in more detail below. Hence, in this situation, the duplex/simplex interface 116 operates in simplex mode for downlink communication since uplink RF signals are not provided to interface 116. Method 200, thus, enables a single hub to support both simplex and duplex operation modes. Supporting both operation modes reduces costs by eliminating the need for a combiner and the need for separate hubs for each operation mode.

Figure 3:
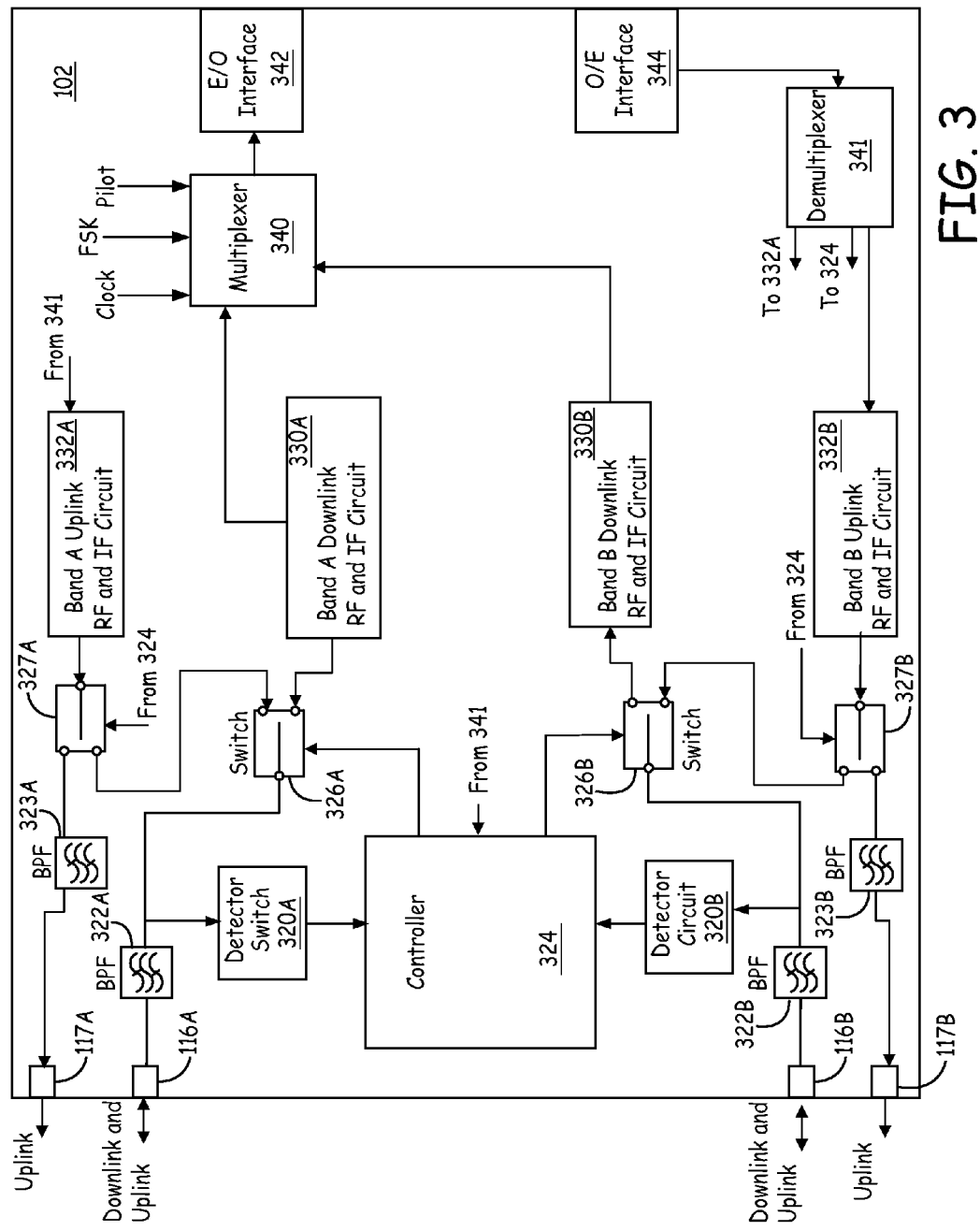
FIG. 3 is a block diagram of one exemplary embodiment of a main hub suitable for use in the DAS shown in FIG. 1

FIG. 3 is a block diagram of one exemplary embodiment of a main hub 102 suitable for use in the DAS shown in FIG. 1. As described above, main hub 102 is implemented to distribute TDD WiMAX RF signals. Hub 102 includes two band-pass filters 322, one for each frequency band, and two band-pass filters 323, one for each frequency band. The band-pass filters 322 are individually referenced in FIG. 3 as 322A and 322B. Each band-pass filter 322 is coupled to a respective one of the duplex/simplex RF interfaces 116 of the main hub 102. Band-pass filters 323 are individually referenced in FIG. 3 as 323A and 323B. Each band-pass filter 323 is coupled to a respective one of simplex uplink interfaces 117. Band-pass filters 322 filter out any out-of-band signals (that is, any signals that are outside of the respective frequency band A or B) that are included in the downlink RF signals received on the respective RF interface 116 and in the uplink RF signals output on the respective RF interface 116. Band-pass filters 323 filter out any out-of-band signals that are included in the uplink RF signals output on the respective RF interface 117.

The main hub 102 includes a respective downlink IF/RF circuit 330 and uplink IF/RF circuit 332 for each of the frequency bands A and B. The downlink IF/RF circuits 330 are individually referenced in FIG. 3 as 330A and 330B, and the uplink IF/RF circuits 332 are individually referenced in FIG. 3 as 332A and 332B. For each of the bands A and B, a respective switch 326 is used to selectively couple the respective band-pass filter 322 to either the respective downlink IF/RF circuit 330 or the respective uplink IF/RF circuit 332 under the control of a respective TDD control signal for that band when operating in duplex mode. The switches 326 are individually referenced in FIG. 3 as 326A and 326B.

Similarly, for each of the bands A and B, a respective switch 327 is used to selectively couple the respective uplink IF/RF circuit 332 to either the respective switch 326 or the respective band-pass filter 323 for that band when operating in simplex mode. The switches 327 are individually referenced in FIG. 3 as 327A and 327B. Additionally, when operating in simplex mode, switches 326 are set only to couple the respective downlink IF/RF circuit 330 to the respective band-pass filter 322.

Each downlink IF/RF circuit 330 downconverts the respective RF signals to a respective IF frequency band. As noted above, in the TDD WiMAX embodiment described here, both of the downlink RF signals for bands A and B have the same RF frequency band and the downlink IF/RF circuits 330 downconvert the RF signals for bands A and B to different IF bands. In one implementation, each downlink IF/RF circuit 330 comprises a mixer that downconverts the respective RF signals using an appropriate IF reference signal that is generated, for example, from a global reference signal (CLOCK) that is used by the downlink IF/RF circuits 330 and the uplink IF/RF circuits 332 and the corresponding circuits in each of the RAUs 106. In such an implementation, the downconverted output of the mixer is then conditioned (for example, amplified and/or attenuated to adjust the gain of the downconverted signal and band-pass filtered to eliminate any out-of-band signals).

A multiplexer 340 combines the downlink IF signals output by the downlink IF/RF circuits 330, the global reference signal (CLOCK), an operations, administration, and maintenance (OAM) channel (FSK), and a downlink pilot signal (PILOT). The OAM channel is used for communicating operations, administration, and maintenance information between the main hub 102 and each of the remote antenna units 106. In the particular embodiment shown in FIG. 3, such OAM information is modulated on and demodulated from the OAM channel using frequency-shift keying (FSK) modulation/demodulation. The downlink pilot signal is used to perform downlink automatic gain control in the remote antenna units 106. The downlink IF signals, the global reference signal (CLOCK), the operations channel (FSK), and the downlink pilot signal (PILOT) are combined using frequency division multiplexing (FDM). The electrical output of the multiplexer 340 is used to modulate an optical carrier (using an analog optical modulator (shown in FIG. 3 as E/O interface 342)). The resulting downlink optical signal is then split and provided to each of the expansion hubs 104.

The main hub 102 also comprises an O/E interface 344 for each of the expansion hubs 104 to which the main hub 102 is connected. Each O/E interface 344 demodulates a respective uplink optical signal transmitted from a respective expansion hub 104. The resulting electrical uplink signal is then demultiplexed by a demultiplexer 341 on a frequency basis to separate the uplink IF signal for frequency band A from the uplink IF signal for frequency band B and to extract an uplink pilot signal (which is used for automatic gain control of the uplink IF signals) and the OAM signal (which is provided to a controller 324 (described below) for processing). The uplink IF signal for each band is supplied to the respective uplink IF/RF circuit 332.

Each uplink IF/RF circuit 332 upconverts the respective uplink IF signals to a respective RF frequency band. As noted above, in the TDD WiMAX embodiment described here, both of the uplink RF signals for bands A and B have the same RF frequency band and each uplink IF/RF circuits 332 upconverts the IF signals for bands A and B (which have differing frequency bands) to the same RF band. In one implementation, each uplink IF/RF circuit 332 comprises a mixer that upconverts the respective IF signals using an appropriate RF reference signal that is generated, for example, from the global reference signal (CLOCK). In such an implementation, the upconverted output of the mixer is then conditioned (for example, amplified and/or attenuated to adjust the gain of the upconverted signal using the uplink pilot signal and band-pass filtered to eliminate any out-of-band signals).

The main hub 102 comprises a controller 324 that controls the operation of the DAS 100. The controller 324 generates signals to control the switching of switches 322 and 323 for both bands A and B. When configuring main hub 102 for duplex operation, controller 324 asserts a switch control signal which indicates that the respective switches 327 are to couple the respective uplink IF/RF circuits 332 to the respective switches 326. Then, while operating in duplex mode, the controller 324 generates switch control signals for the respective switches 326 based on a detection signal produced by a respective detector circuit 320. Each of the detector circuits 320 is individually referenced in FIG. 3 as 320A and 320B. Each detector circuit 320 is coupled to a respective band-pass filter 322. Each detector circuit 320 monitors for communication downlink RF signals propagating in the downlink direction. When each detector circuit 320 detects downlink RF signals, the detector circuit 320 asserts its detection signal to indicate that fact to the controller 324. Each detector circuit 320 can be implemented using any appropriate detector circuit configured to detect signals being communicated in a given direction. An exemplary detector circuit is shown and described in more detail in FIG. 4.

When one of the detector circuits 320 asserts its detection signal, controller 324 asserts a respective switch control signal for the corresponding frequency band. For example, if detector circuit 320A detects a downlink RF signal for band A, controller 324 asserts its control signal for band A. Each switch 326 is configured to couple the respective downlink IF/RF circuit 330 to the respective RF interface 116 when the switch control signal is asserted and to couple the respective uplink IF/RF circuit 332 to the respective RF interface 116 when the respective switch control signal is not asserted. The results of such switching is to enable the respective downlink IF/RF circuit 330 to downconvert and condition any downlink RF signals being communicated in the downlink direction and to enable the respective uplink IF/RF circuit 332 to upconvert and condition any uplink IF signals that are being communicated in the uplink direction.

When configuring hub 102 for simplex mode, controller 324 generates and asserts a switch control signal for the respective switches 326 and 327. Specifically, controller 324 asserts a switch control signal which indicates that the respective switches 326 are to couple the respective downlink IF/RF circuit 330 to the respective band-pass filter 322 for each band. Controller 324 also asserts a control signal which indicates that the respective switches 327 are to couple the respective uplink IF/RF circuits 332 to the respective band-pass filters 323. During simplex mode operation, controller 324 does not assert additional switch control signals.

Figure 4:
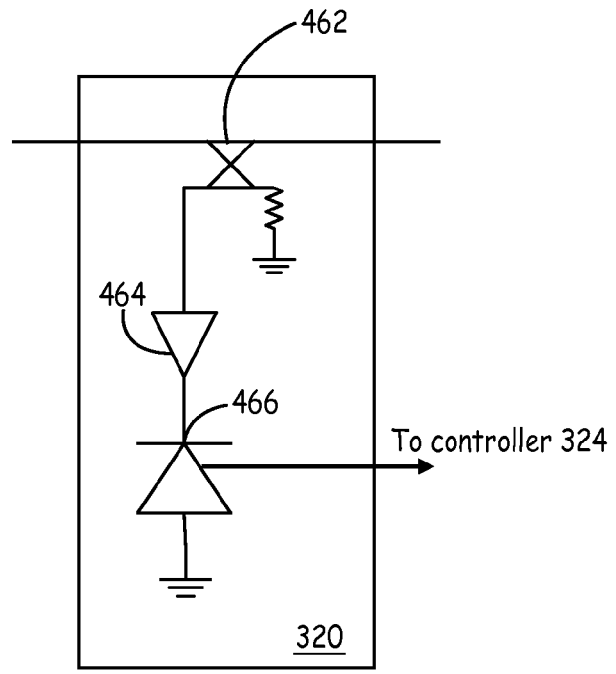
FIG. 4 is a block diagram of one exemplary embodiment of a detector circuit used in a main hub.

FIG. 4 is a block diagram of an exemplary detector circuit 320 used in a main hub 102. As shown in FIG. 4, detector circuit 322 includes a directional coupler 462 which is configured to unequally split signals propagating in the downlink direction and to fully pass signals propagating in the uplink direction. Thus, a small portion of the signal amplitude for downlink signals is passed through directional coupler 462 to amplifier 464. Amplifier 464 amplifies the split signal by a pre-determined gain. The amplified signal is then passed to detector 466. Detector 466 prohibits the amplified signal from passing to controller 324, unless a threshold amplitude level is exceeded. Thus, detector 466 prevents noise from being misinterpreted as a downlink signal. Once the threshold amplitude level is exceeded, the amplified signal is passed to the controller. Detector 466 can be implemented using various circuit components including, but not limited to, a reversed-biased diode, a root mean square (RMS) detector, and an integrated circuit detector, such as Analog Devices IC part number AD8362. Additionally, detector circuit 322 is not limited to the exemplary detector circuit shown in FIG. 4. For example, in some embodiments, a detector circuit as described in the '921 Application or the '916 Application is used.

Figure 5:
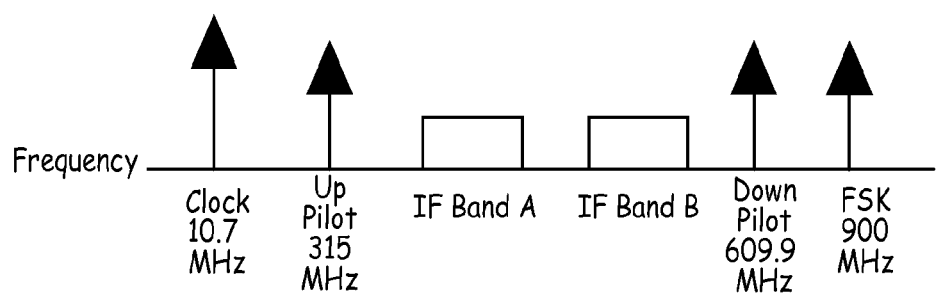
FIG. 5 is a frequency map for signals communicated to and from the main hub.

FIG. 5 is a frequency map for signals communicated to and from the main hub 102. Notably, the frequencies shown in FIG. 5 and discussed herein are provided by way of example and not by way of limitation. It is to be understood that other frequencies can be used in other embodiments. Each of the IF bands includes a portion (that is, a sub-band) for communicating uplink IF signals and a portion for communication downlink IF signals. The frequency map includes the global reference signal (CLOCK) (at 10.7 MHz in the example shown in FIG. 5). The frequency also includes an IF frequency band which corresponds to each of the RF bands A and B. In some embodiments, bands A and B are selectable to be either 30 MHz or 66 MHz in width. The operational RF and corresponding IF frequency bands are field configured during installation. For example, Table 1 below displays exemplary uplink and downlink IF frequency bands for each of bands A and B when configured as 30 MHz or 66 MHz bands.

TABLE 1

| Selectable Filter 66 MHz or 30 MHz | | Downlink IF Frequency BW | | | Uplink IF Frequency BW | | |
|---|---|---|---|---|---|---|---|
| | | Low | Center | High | Low | Center | High |
| Band A | IF for 66 MHz BW | 317 | 350 | 383 | 54 | 87 | 120 |
| | IF for 30 MHz BW | 335 | 350 | 365 | 72 | 87 | 102 |
| Band B | IF for 66 MHz BW | 462 | 495 | 528 | 172 | 205 | 238 |
| | IF for 30 MHz BW | 480 | 495 | 510 | 190 | 205 | 220 |

The frequency map also includes a downlink pilot signal and an uplink pilot signal (PILOT) (at 609.9 MHz and 315 MHz, respectively, in the example shown in FIG. 5). The Uplink pilot signal in this example is set at 315 MHz between the main hub 102 and expansion hubs 104. Additionally, the uplink pilot signal, in this example, is set at 140 MHz between the expansion hubs 104 and RAU 106. The frequency map also includes the OAM channel (FSK) (at 900 MHz in the example shown in FIG. 5).

Figure 6:
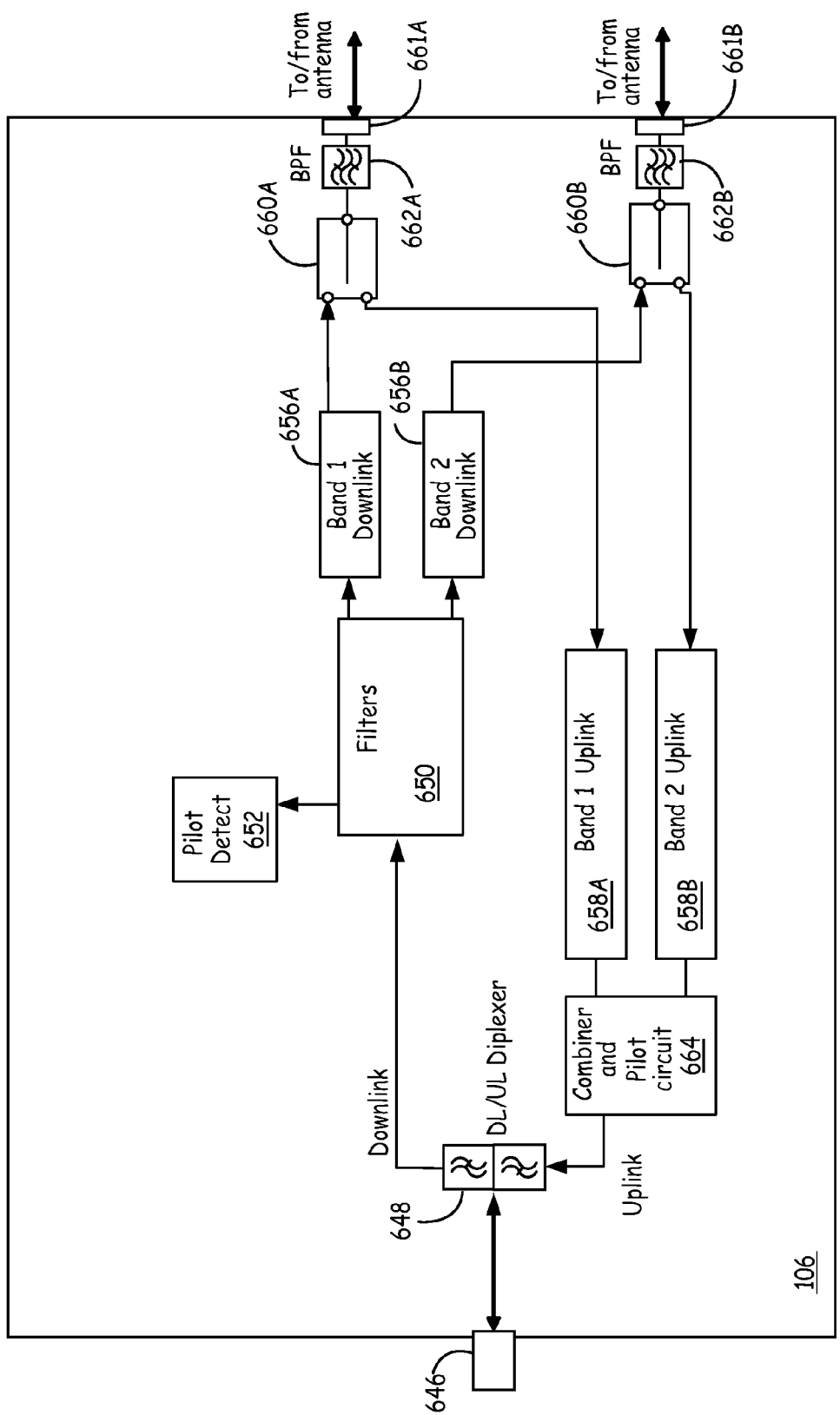
FIG. 6 is a block diagram of one embodiment of a remote antenna unit suitable for use in the DAS of FIG. 1

FIG. 6 is a block diagram of one embodiment of a remote antenna unit 106 suitable for use in the DAS 100 of FIG. 1. RAU 106 communicatively coupled to a respective expansion hub 104 via a transport interface 646. A diplexer 648 is used to output uplink IF signals and uplink pilot signals on the transport interface 646 and to receive the downlink IF signals, global reference signal, downlink pilot signal, and OAM signal. The downlink signals are separated by filters 650. The pilot signal is passed to the pilot detector 652 for use in controlling the gain of the downlink RF signals that are ultimately radiated from the RAU 106.

The RAU 106 includes a downlink IF/RF circuit 656 for each of the frequency bands A and B (which are individually referenced as 656A and 656B), and an uplink IF/RF circuit 658 for each of the frequency bands A and B (which are individually referenced as 658A and 658B).

Each downlink IF/RF circuit 656 upconverts the respective downlink IF signals to a respective RF frequency band. As noted above, in the TDD WiMAX embodiment described here, both of the downlink RF signals for bands A and B have the same RF frequency band. The downlink IF/RF circuits 656 upconvert the IF signals for the bands A and B (which have differing IF frequency bands) to the same RF band. In one implementation, each downlink IF/RF circuit 656 comprises a mixer that upconverts the respective IF signals using an appropriate RF reference signal that is generated, for example, from the global reference signal (CLOCK) that is received at the RAU 106. In such an implementation, the upconverted output of the mixer is then conditioned (for example, amplified and/or attenuated to adjust the gain of the upconverted signal using the downlink pilot signal and band-pass filtered to eliminate any out-of-band signals). The upconverted RF signal is then supplied to a respective one of the antennas 118 for radiating therefrom (via a respective switch 760 and a respective band-pass filter 762—when the respective switch 760 couples the downlink IF/RF circuit 656 to the antenna 118 as described below). Each of the antennas 118 are coupled to the remote antenna unit 106 (and the components thereof) via a respective radio frequency interface 661.

The uplink RF signals received from each of the antennas 118 are provided to a respective uplink IF/RF circuit 658 (via a respective band-pass filter 662 and a respective switch 660—when the respective switch 660 couples the antenna 118 to the uplink IF/RF circuit 658 as described below). Each uplink IF/RF circuit 658 downconverts the respective uplink RF signals to a respective IF frequency band. As noted above, in the TDD WiMAX embodiment described here, both of the uplink RF signals for bands A and B have the same uplink RF frequency band and the uplink IF/RF circuits 658 downconvert the uplink RF signals for bands A and B to different IF bands. In one implementation, each uplink IF/RF circuit 658 comprises a mixer that downcoverts the respective uplink RF signals using an appropriate IF reference signal that is generated, for example, from a global reference signal (CLOCK) received at the RAU 106. In such an implementation, the downcoverted output of the mixer is then conditioned (for example, amplified and/or attenuated to adjust the gain of the downcoverted signal and band-pass filtered to eliminate any out-of-band signals).

A combiner 664 combines the uplink IF signals output by the uplink IF/RF circuits 658 and the uplink pilot signal. The uplink pilot signal is used to perform uplink automatic gain control in the main hub 102. The uplink IF signals and the uplink pilot signal are combined using frequency division multiplexing. The output of the combiner 664 is output on the transport interface 646 via the diplexer 648.

Although the embodiments shown in FIGS. 1-6 are described as using one or more expansion hubs 104 to couple the main hub 102 to the remote antenna units 106. In another embodiment, the main hub 102 is coupled to the remote antenna units 106 directly without an expansion hub. In one such embodiment, the main hub is similar to the main hub 102 shown in FIGS. 1 and 3 except that the main hub includes a splitter that splits the downlink IF signal output by the multiplexer 340 into separate instance of the downlink IF signal for each remote antenna unit to which the main hub is coupled. The main hub in such an implementation also includes a separate diplexer for each remote antenna unit to which the main hub is coupled, where the diplexer combines an instance of the downlink IF signal with an uplink IF signal output by the remote antenna unit associated with that diplexer. The main hub, in such an implementation, also includes a combiner that combines all of the uplink IF signals received from the remote antenna units and outputs a combined uplink IF signal that is supplied to the demultiplexer 341. In some embodiments, some of the remote antenna units are coupled to the main hub via an expansion hub and some of the remote antenna units are coupled directly to the main hub without an expansion hub.

Although the embodiments shown in FIGS. 1-6 are described as being implemented to transport two frequency bands, in other embodiments, a different number of frequency bands are transported. For example, in one such embodiment, the DAS is used to distribute a single frequency band (for example, using relatively low bandwidth cabling such as unshielded twisted-pair cabling). In another embodiments, three or more frequency bands are transported.

Although the embodiments shown in FIGS. 1-6 are described as being implemented to transport two MIMO WiMAX frequency bands, in other embodiments, other types of TDD signals are transported (for example, non-MIMO WiMAX signals).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication system comprising:
    a first unit; and
    a second unit communicatively coupled to the first unit;
    wherein the first unit is operable to receive a first original radio frequency signal from an upstream device via a first interface and the second unit is operable to receive a second original radio frequency signal from a downstream device via a second interface;
    wherein the second unit is operable to output a first reproduced radio frequency signal to the downstream device via the second interface, the content of the first reproduced radio frequency signal being derived from the first original radio frequency signal;
    wherein the first unit is operable to output a second reproduced radio frequency signal to the upstream device via one of the first interface and a third interface, the content of the second reproduced radio frequency signal being derived from the second original radio frequency signal;
    wherein the first interface is operable as a simplex interface when the second reproduced radio frequency signal is output via the third interface and as a duplex interface when the second reproduced radio frequency signal is output via the first interface.

2. The communication system of claim 1, wherein the system comprises a distributed antenna system, the first unit comprises a main hub, and the second unit comprises at least one remote antenna unit.

3. The communication system of claim 2, wherein the main hub is communicatively coupled to the at least one remote antenna unit via at least one expansion hub.

4. The communication system of claim 3, wherein the at least one expansion hub comprises four expansion hubs, each expansion hub coupled to the main hub and up to eight remote antenna units.

5. The communication system of claim 3, wherein the at least one expansion hub is coupled to the main hub over an optical link and to the at least one remote antenna unit over an electrical link.

6. The communication system of claim 1, wherein each of the at least one remote antenna unit and the main hub are operable to receive and output radio frequency signals according to the IEEE 802.16e time division duplexing scheme.

7. The communication system of claim 1, wherein the first unit comprises:
    a downlink circuit configured to process radio frequency signals received via the first interface;
    a uplink circuit configured to process signals for output over one of the first interface and the third interface;
    a first switch configured to couple the first interface to one of the uplink circuit and the downlink circuit;
    a second switch configured to couple the uplink circuit to one of the first switch and the third interface; and
    a switch controller configured to control switching of the first and second switches;
    wherein the first switch is configured to couple the first interface to only the downlink circuit when the second switch couples the uplink circuit to the third interface; and
    wherein the first switch is configured to couple the first interface to either the downlink circuit or the uplink circuit when the second switch couples the uplink circuit to the first switch.

8. The communication system of claim 7, wherein the first unit further comprises:
    a detector circuit configured to monitor for radio frequency signals received via the first interface;
    wherein when radio frequency signals are received via the first interface, the detector circuit passes a signal to the switch controller which indicates that the first switch is to be switched such that the first interface is coupled to the downlink circuit.

9. The communication system of claim 8, wherein the detector circuit comprises:
    a direction coupler configured to split off a portion of radio frequency signals received at the first interface;
    an amplifier coupled to the directional coupler and configured to amplify the split-off portion of the radio frequency signals propagating; and
    a detector configured to block propagation of the amplified split-off portion unless the amplitude of the split-off portion exceeds a threshold amplitude level.

10. The communication system of claim 7, wherein the first unit further comprises:
    a first bandpass filter coupled to the first interface and configured to select a desired frequency band; and
    a second bandpass filter coupled to the third interface and configured to select a desired frequency band.

11. The communication system of claim 1, wherein the first unit is operable to receive a plurality of first original radio frequency signals and the second unit is operable receive a plurality of second original radio frequency signals;
    wherein a multiple-input-multiple-output scheme is used to transmit the plurality of original first radio frequency signals and the plurality of original second radio frequency signals on the same radio frequency channel;
    wherein the second unit is coupled to a plurality of antennas, wherein each of the plurality of first reproduced radio frequency signals is output on a respective one of the plurality of antennas and each of the plurality of second original radio frequency signals is received on a respective one of the plurality of antennas.

12. The communication system of claim 11, wherein the plurality of first original radio frequency signals and the plurality of second original radio frequency channels are originally transmitted on a plurality of radio frequencies using time division duplexing.

13. The communication system of claim 1, wherein the first original radio frequency signal is transmitted to the first interface of the first unit by a base station and the second original radio frequency signal is broadcast by a wireless unit.

14. The communication system of claim 13, wherein the base station is communicatively coupled to the first unit via one of: directly connecting the base station to the first interface of the first unit and wirelessly coupling the base station to the first unit.

15. The communication system of claim 14, wherein the base station is wirelessly coupled to the first unit via an intermediary device, wherein the intermediary device is directly connected to the first unit via a wired connection.

16. The communication system of claim 15, wherein the intermediary device comprises at least one of a repeater and a bi-directional amplifier.

17. The communication system of claim 1, further comprising a plurality of second units.

18. A communication unit comprising:
a first interface operable to receive original radio frequency signals from an upstream device, the first interface being further operable to transmit reproduced radio frequency signals to the upstream device;
a second interface operable to transmit reproduced radio frequency signals to the upstream device;
a first circuit operable to generate transport signals for transporting the original radio frequency signals to a second unit operable to reproduce and output the original radio frequency signals to a downstream device;
a second circuit operable to generate reproduced radio frequency signals for transmission over one of the first and second interfaces to the upstream device, the reproduced radio frequency signals based on signals received from the second unit;
a first switch operable to couple the first interface to one of the first circuit and the second circuit;
a second switch operable to couple the second circuit to one of the first switch and the second interface; and
a switch controller operable to control switching of the first and second switches
wherein the first switch is configured to couple the first interface to only the first circuit when the second switch couples the second circuit to the second interface; and
wherein the first switch is configured to couple the first interface to either the first circuit or the second circuit when the second switch couples the second circuit to the first switch.

19. The communication unit of claim 18, wherein the communication unit is operable to receive and output radio frequency signals according to the IEEE 802.16e time division duplexing scheme.

20. The communication unit of claim 18, wherein the communication unit further comprises:
a detector circuit configured to monitor for radio frequency signals received via the first interface;
wherein when radio frequency signals are received via the first interface, the detector circuit passes a signal to the switch controller which indicates that the first switch is to be switched such that the first interface is coupled to the downlink circuit.

21. The communication unit of claim 20, wherein the detector circuit comprises:
a direction coupler configured to split off a portion of radio frequency signals received at the first interface;
an amplifier coupled to the directional coupler and configured to amplify the split-off portion of the radio frequency signals propagating; and
a detector configured to block propagation of the amplified split-off portion unless the amplitude of the split-off portion exceeds a threshold amplitude level.

22. The communication unit of claim 20, wherein the communication unit further comprises:
a first bandpass filter coupled to the first interface and configured to select a desired frequency band; and
a second bandpass filter coupled to the second interface and configured to select a desired frequency band.

23. The communication unit of claim 18, wherein the first original radio frequency signal comprises an original downlink radio frequency signal, the first circuit comprises a downlink circuit; and the second circuit comprises an uplink circuit.

24. The communication unit of claim 18, wherein the communication unit is operable to be coupled to a plurality of second units.

25. A method of configuring the operation mode of a communication unit, the method comprising:
producing a control signal indicating the desired operation mode;
when the control signal indicates the desired operation mode is duplex mode,
switching a first switch between a first circuit, operable to generate transport signals for transporting original radio frequency signals to a second unit, and a second circuit, operable to generate reproduced radio frequency signals, to couple one of the first circuit and the second circuit to a first interface; and
switching a second switch to connect the second circuit to the first switch; and
when the control signal indicates the desired operation mode is simplex mode,
switching the first switch to couple the first circuit to the first interface; and
switching the second switch to couple the second circuit to a second interface.

26. The method of claim 25, wherein switching the first switch between the first circuit and the second circuit comprises:
monitoring for the original radio frequency signals received via the first interface;
when original radio frequency signals are detected, switching the first switch to couple the first circuit to the first interface; and
when original radio frequency signals are not detected, switching the first switch to couple the second circuit to the first interface.

27. The method of claim 26, wherein monitoring for the original radio frequency signals comprises:
splitting off a portion of the original radio frequency signals;
amplifying the split-off portion of the original radio frequency signals; and
passing the amplified split-off portion of the original radio frequency signals to a switch controller if the amplitude of the split-off portion exceeds a threshold level.

28. The method of claim 25, wherein producing a control signal comprises producing a control signal based on user input during installation of the communication unit.

* * * * *